July 8, 1947.   J. L. HVALE   2,423,559
PRESSURE COOKER COVER FASTENER
Filed July 27, 1946   2 Sheets-Sheet 1
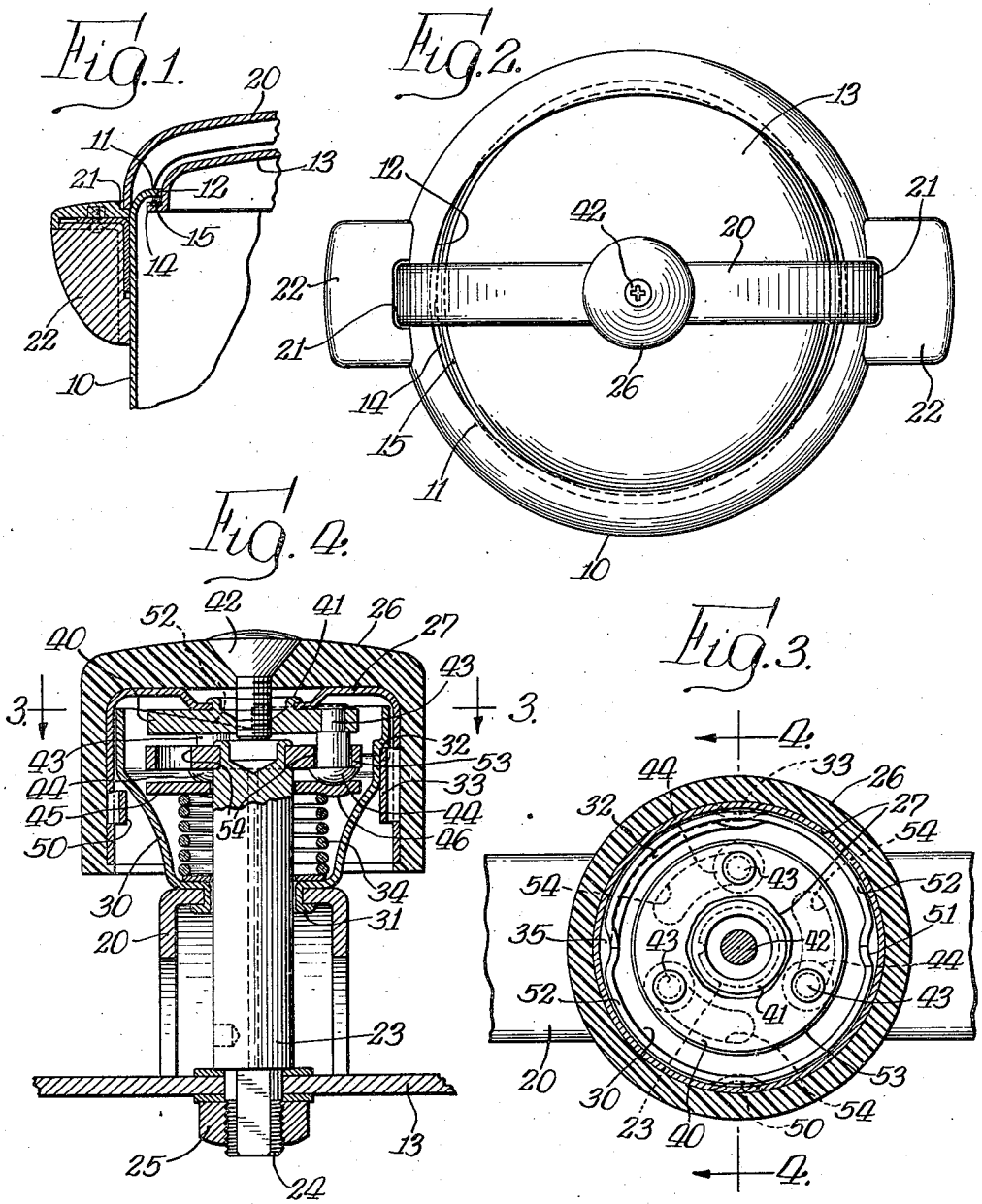
INVENTOR.
James L. Hvale,
BY
Davis, Lindsey, Smith & Shonts
Att'ys July 8, 1947.   J. L. HVALE   2,423,559
PRESSURE COOKER COVER FASTENER
Filed July 27, 1946   2 Sheets-Sheet 2

INVENTOR.
James L. Hvale,
BY
Davis, Lindsey, Smith & Shonts
Attys.

Patented July 8, 1947

2,423,559

UNITED STATES PATENT OFFICE 2,423,559

PRESSURE COOKER COVER FASTENER

James L. Hvale, Chicago, Ill., assignor to Ekco Products Company, Chicago, Ill., a corporation of Illinois Application July 27, 1946, Serial No. 686,623

10 Claims. (Cl. 220—55)

The invention relates generally to pressure cookers of a type suitable for home use, and more particularly to the cover structure of such a cooker.

The general object of the invention is to provide a pressure cooker of the type having an elliptical opening and cover with the cover removable from and insertable into the receptacle by tilting the cover and rotating it 90° out of alignment with the opening, the cooker having novel means for effectively moving the cover into tight sealing engagement with the underside of the margin of the opening so that pressure may be built up within the receptacle.

Another object is to provide a novel pressure cooker of the foregoing type, in which the cover is primarily urged by a spring into sealing engagement with the margin of the opening, and tightening of the sealing engagement is effected through manually operable means.

A further object is to provide a novel pressure cooker of the foregoing type, having a manually rotatable element to turn the cover into and out of alignment with the receptacle opening and a spring for effecting primary sealing engagement of the cover with the margin of the opening, said manually rotatable element being adapted, by rotation beyond what is necessary to align the cover with the opening, to tighten such engagement.

Still another object is to provide a pressure cooker of the foregoing type, having a spring tending to move the cover into sealing engagement with the margin of the opening, and a manually rotatable member for turning the cover into and out of alignment with the opening, the turning movement of said member in a direction to move the cover out of such alignment providing a locking action holding the cover against movement by the spring, and turning movement in the opposite direction releasing the lock to permit the spring to act and, with continued turning movement, to force the cover into tighter engagement with the margin of the opening than that effected by the spring alone.

Other objects and advantages will become apparent from the following description taken in connection with the accompanying drawings, in which:

Figure 1 is a fragmentary sectional view of a pressure cooker showing the manner in which the cover engages the receptacle.

Fig. 2 is a plan view of the pressure cooker shown in Fig. 1 and illustrating the cover in a position ready for removal.

Fig. 3 is a fragmentary plan view, partially in section, of the cover supporting means, the sectional portion thereof being taken on the line 3—3 of Fig. 4, and showing the parts in position for removal of the cover.

Fig. 4 is a vertical sectional view taken on the line 4—4 of Fig. 3.

Figure 5:
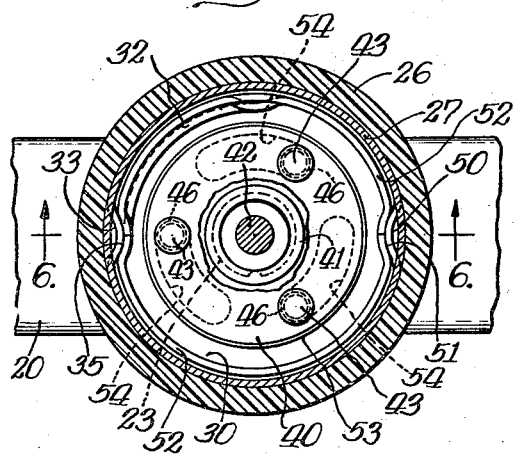
Fig. 5 is a view similar to Fig. 3 but showing the parts in their position when the cover is initially clamped in sealing engagement with the receptacle.
Figure 7:
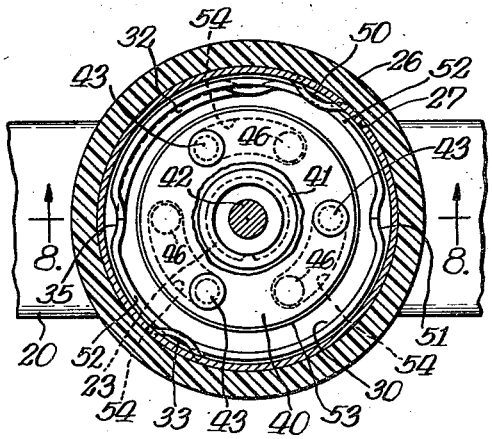
Fig. 7 is a view similar to Figs. 3 and 5 but showing the position of the parts when the cover is fully clamped in sealing engagement with the receptacle.

The novel features of the invention disclosed herein, while relating generally to a pressure cooker, refer particularly to the means for clamping the cover to the receptacle so that a tight seal is effected therebetween and steam pressure may be raised within the receptacle. To illustrate the invention, I have shown in Figs. 1 and 2 a receptacle 10 which is of generally cylindrical form with the side wall bent inwardly at its upper edge to provide a flange 11. The flange 11 defines an opening 12 adapted to be closed by a cover 13.

The flange 11 and cover 13 are so arranged that the cover extends under the flange to engage the underside thereof so that steam pressure within the receptacle 10 will tend to cause the cover to move into tight clamping engagement with the flange 11. Thus, the construction may be said to be in some respects self-sealing. In the present instance, the cover 13 is provided with an outwardly directed flange 14 at its periphery with a gasket 15 of rubber or the like seated and rigidly secured in the flange 14 to engage the flange 11 when the cover is clamped in position.

In this type of construction, the opening 12, as well as the cover 13, is preferably made elliptical or oval in form, and the cover, when it is to be removed, is rotated 90° out of alignment with the opening 12, as illustrated in Fig. 2, so that the shorter diameter of the cover can be passed through the longer diameter of the opening 12. To permit such passage, the cover 13 is tilted and one edge at the extremity of the longer diameter is passed through the opening and the entire cover thereby removed. This general construction of the cover and the opening which it closes is well known in the art.

As mentioned above, the invention herein relates to the means for supporting and manipulating the cover 13 so that it may be readily removed from the receptacle and may be re-inserted therein and forced into tight clamping engagement with the flange 11 of the receptacle. The cover supporting means comprises generally a bridge member adapted to rest on the receptacle and to rotatably support the cover in its movement in and out of alignment with the opening 12 and to provide for movement of the cover vertically relative to the receptacle. The cover is preferably supported on a stem normally secured to a manually rotatable member by which the cover may be turned relative to the bridge member and relative to the receptacle. When the cover is rotated out of alignment with the opening 12, it is locked and held out of engagement with the flange 11. When rotated back into alignment with the opening 12, spring means is provided for primarily moving the cover into sealing engagement with the flange 11, and then further rotation of the manually operable member is permitted to effect a tightening of the cover against the flange 11 without further rotation of the cover.

In the particular embodiment illustrated in the drawings, I have shown a bridge member 20 of generally channel-shaped cross section and upwardly bent intermediate its ends so that said ends may rest in pockets 21 provided on the receptacle preferably in handle portions 22 of the receptacle. The bridge member 20 thus spans the opening 12 and is held against rotation relative to the receptacle. At its mid point, the bridge 20 is provided with an aperture through which a stem 23 extends, the stem being provided at its lower end with a reduced threaded portion 24 to receive the cover 13 and a nut 25 to clamp the cover on the stem.

The stem 23 is adapted to be rotated to move the cover into and out of alignment with the opening 12 and to move vertically relative to the bridge member 20 to shift the cover into and out of sealing engagement with the rim 11 of the receptacle. To this end, I provide a manually rotatable member, herein shown in the form of an inverted cup 26, preferably of plastic material and mounted over a metallic cup 27, the two cups being rigid with one another. The cup 27 is frictionally connected to the stem 23 by means hereinafter described which permits the manually rotatable member 26 to be rotated with the cover to swing the cover into and out of alignment with the opening 12, but permits rotation of the member 26 relative to the cover to effect the tightening of the sealing engagement of the cover with the flange 11.

When the cover is rotated out of alignment with the opening 12, as illustrated in Fig. 2, I provide means for holding the cover so that it is out of engagement with the flange 11. In the present instance, such means comprises a cup-shaped element 30 rigidly secured to the bridge member 20. As a simple construction to so secure the cup-shaped element 30, I provide it with a central aperture having a flange 31 (see Fig. 4) which extends downwardly through the aperture in the bridge member 20 receiving the stem 23. The flange 31 is crimped over the underside of the bridge member to firmly hold the cup-shaped member 30 in place on the bridge member against rotation. The cup-shaped member 30 is also provided with a downwardly facing shoulder 32 adapted to engage a lug 33 formed on the inner cup 27 by slitting and inwardly indenting the slit portion thereof. The upper edge of the lug 33 engages the shoulder 32 to hold the manually rotatable member 26 down. Thus, the cover 13 will be held at a point remote from the bridge member, that is, spaced a substantial distance below the bridge member so that the flange 14 of the cover is out of engagement with the flange 11 of the receptacle. A coiled spring 34 mounted within the cup-shaped element 30 about the stem 23 and bearing against the bottom of the cup-shaped element 30 exerts an upward pressure tending to move the manually rotatable member 26 upward so that the lug 33 is held in tight engagement with the shoulder 32.

The shoulder 32 extends for 90° about the cup-shaped element 30 so that the cover may be rotated through a 90° angle into and out of alignment with the opening 12 while its periphery is out of engagement with the flange 11. Thus, as shown in Fig. 3, the lug 33 engages one end of the shoulder 32 while the other end of the shoulder 32 emerges into a vertical channel 35 formed in the side of the cup-shaped element 30. When the manually rotatable member 26 is rotated 90° counterclockwise from the position shown in Fig. 3, the lug 33 becomes aligned with the channel 35 to permit the manually rotatable member to be moved upwardly under the influence of the spring 34. Such upward movement of the manually rotatable member 26, of course, carries the cover 13 with it since it is connected thereto by means of the stem 23, and the flange 14 on the cover thereby primarily engages the flange 11 of the receptacle for sealing engagement.

It is found in practice that the sealing engagement effected by a spring, such as the spring 34, even with the help of pressure within the vessel, is not sufficient to hold the pressure within the vessel. Frequently, this is due to a slight springing or warping of the cover which may occur in the manufacture thereof or may arise as a result of mishandling during use. The present structure provides means for increasing the pressure or tightening the sealing engagement to an extent sufficient to guarantee that pressure will be retained within the receptacle. Since rotation of the manually rotatable member 26 is utilized to bring the cover into alignment with the opening 12 and the spring automatically causes the cover to engage the flange 11 when the cover is in such alignment, it is desirable that continued rotation of the manually rotatable member 26 be utilized to effect the tightening of the sealing engagement. However, for such continued rotation of the manually rotatable member, the cover must be released therefrom so that it will not turn beyond its point of alignment. To this end, I provide a frictional connection between the manually rotatable member 26 and the stem 23 which offers a torque resistance smaller than the torque resistance offered by the friction between the periphery of the cover and the flange 11 of the receptacle. Thus, when the cover 13 is caused to engage the flange 11 by the action of the spring 34, the frictional connection between the manually rotatable member 26 and the stem 23 yields and permits relative rotation therebetween, and such further rotation of the manually rotatable member may then be utilized to effect further tightening of the cover.

The frictional connection herein shown comprises a plurality of bearing members carried by the manually rotatable member 26, and a pressure member held in engagement with the bearing members by the spring 34. In the specific form illustrated, I provide a disc 40 having a flange portion 41 extending through an aperture in the metallic cup 27 and crimped thereto so that the disc 40 is rigidly connected to the metallic cup 27 for rotation therewith. The disc 40 is also utilized to secure the manually rotatable member 26 in place by being provided with a central, threaded aperture to receive a screw 42 clamping the manually rotatable member 26 on the metallic cup 27.

The disc 40 serves as a carrier for a plurality of bearing members comprising, in the present instance, three downwardly extending pins 43 having rounded heads 44. The rounded heads 44 are adapted to engage a disc 45 keyed to the stem 23 but movable longitudinally thereof. The disc 45 serves as an upper bearing plate for the spring 34 so that the latter holds the disc 45 in frictional engagement with the rounded heads 44 of the pins 43. The disc 45 is provided with depressions 46 in which the heads 44 are normally seated during the rotative movement of the cover 13.

Thus, during movement of the cover into and out of alignment with the aperture 12 of the receptacle, the frictional engagement between the pins 43 and the disc 45 provides a driving connection between the manually rotatable member 26 and the cover 13. However, when the cover has been moved into engagement with the flange 11 by the spring 34 and the torque resistance of such engagement is encountered, rotation of the manually rotatable member 26 causes the heads 44 of the pins to cam out of the depressions 46 and force the disc 45 downwardly on the stem a slight distance against the pressure of the spring 34. The manually rotatable member 26, therefore, may be rotated at such time without rotating the cover 13.

Figure 6:
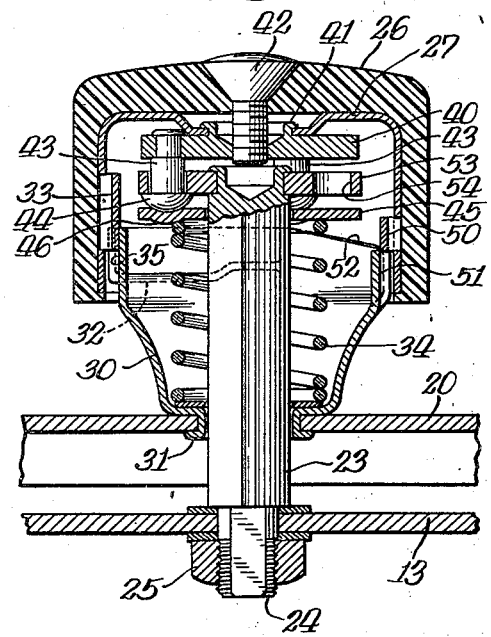
Fig. 6 is a vertical sectional view similar to Fig. 4 but taken on the line 6—6 of Fig. 5.
Figure 8:
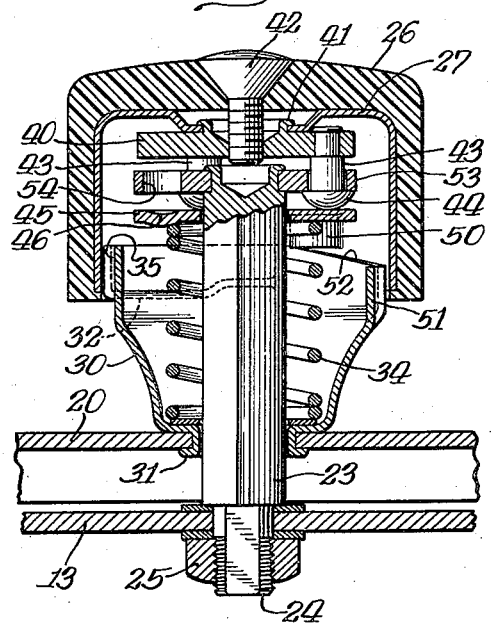
Fig. 8 is a vertical sectional view similar to Figs. 4 and 6 but taken on the line 8—8 of Fig. 7.

To effect a tightening of the sealing engagement of the cover with the flange 11, such further rotation of the manually rotatable member 26 is utilized by providing coacting means on the cup-shaped member 30 and the manually rotatable member 26. Thus, I provide a lug 50, formed by slitting and indenting the metallic cup 27, at a point diametrically opposite the lug 33, the two lugs being positioned so that their bottom edges are on the same level. The lug 50 is adapted to move vertically in a channel 51 in the cup-shaped member 30 when the spring acts to move the cover upwardly. However, when the spring has moved the cover into engagement with the flange 11, which is the position shown in Figs. 5 and 6, the lower edges of the lugs 33 and 50 may be turned into engagement with the upper edge of the cup-shaped element 30. To produce the tightening action, the upper edge of the cup-shaped member 30 is provided with a pair of upwardly slanting cam surfaces 52 engageable by the lugs 33 and 50 so that, with the further rotation of the manually rotatable member 26, the latter is forced upwardly to draw the cover in tighter engagement with the flange 11 of the receptacle. Thus, rotation of the manually operable member 26 is utilized to effect the tightening of the sealing engagement of the cover with the receptacle.

When it is desired to remove the cover, the manually rotatable member 26 is reversely rotated, permitting the lugs 33 and 50 to move downwardly along the cam surfaces 52, thus partially loosening the sealing engagement. When the lugs 33 and 50 have moved into registry with the channels 35 and 51, the cover may be forced downwardly by pressure on the manually rotatable member 26 to compress the spring 34. When the lug 33 reaches the level of the locking shoulder 32, rotation of the manually rotatable member causes engagement of the lug 33 with the shoulder 32 and also rotates the cover out of alignment with the opening. In order to insure that there will be no slippage of the frictional connection between the manually rotatable member 26 and the cover 13 during the rotation to effect the locking, I provide a third disc or washer 53 interposed between the discs 40 and 45 and rigidly connected to the upper end of the stem 23. The intermediate disc 53 is provided with arcuate slots 54 through which pins 43 extend. When the manually rotatable member 26 is ready to rotate the lug 33 into locking engagement with the shoulder 32, the pins 43 are at one end of the arcuate slots 54 so that rotation of the cover 13 with the manually rotatable member 26 at that time is thereby insured. The slots have an arcuate length sufficient to permit the lugs 33 and 50 to move upwardly on the cam surfaces 52 so that during such period the manually rotatable member 26 is freed of the stem 23.

To briefly describe the operation, let us assume that the parts are in the position shown in Fig. 2 where the cover 13 is 90° out of alignment with the opening 12. At such position, the lug 33 is in engagement with the locking shoulder 32 at the opposite extremity thereof from the channel 35, as shown in Figs. 3 and 4. By counterclockwise rotation of the manually rotatable member 26 from such position, the lug 33 is brought in registry with the channel 35 and the cover 13 is brought into alignment with the opening 12. The spring 34 thereupon moves the cover upwardly to engage the flange 11 of the receptacle in primary sealing engagement.

Further counterclockwise rotation of the manually rotatable member 26 effects release of the frictional engagement between the pins 43 and the disc 45 since the torque resistance of the cover 13 with the flange 11 exceeds the torque resistance between the pins 43 and the disc 45. At such time, the lugs 33 and 50 are at the start of the inclined cam surfaces 52 so that such further counterclockwise rotation of the manually rotatable member 26 exerts a further upward pressure of the cover 13 against the flange 11. A slight flexing of the cover may take place at this time. Such further rotation is permitted since the pins may, during this period, move in the arcuate slots 54.

On clockwise rotation of the manually rotatable member 26 to open the receptacle, the pins again slide on the disc 45 until they reach the point where they are seated in the depressions 46 therein. At that point, the pins 43 have reached the ends of the slots 54, and the lugs 33 and 50 have moved into registry with the channels 35 and 51. The manually rotatable member 26 is then pressed downwardly to compress the spring 34 and, by further counterclockwise rotation, the lug 33 is moved into engagement with the locking shoulder 32 to hold the cover at a point below or spaced from the flange 11. Continued rotation in the counterclockwise direction moves the cover 90° out of alignment with the opening 12 so that it may be tilted and removed.

From the foregoing description, it will be apparent that I have provided novel means for moving a cover of the type herein disclosed into tight sealing engagement with the margin of the opening of the receptacle. While the spring 34 primarily acts to effect the sealing engagement, tightening thereof is effected through continued rotation of the manually rotatable member 26 after the rotation thereof which moves the cover into alignment with the opening 12. When the cover is in position for removal, it is held by a locking action against engagement with the flange 11 so that it may be readily tilted and removed from the receptacle.

I claim:

1. In a pressure cooker comprising a receptacle having an elliptical top opening and a cover with the cover engageable with the underside of the margin of said opening and movable therethrough when tilted and rotated 90° out of alignment with the opening, means for effecting rotation of the cover into alignment with the opening and movement thereof upwardly into sealing engagement with said margin, said means comprising a vertical stem projecting from the cover, a bridge member adapted to rest on the receptacle and rotatably and slidably supporting said stem, a locking element fixed to said bridge member, a manually rotatable element connected to said stem for rotating said cover relative to said bridge member and adapted by rotation in one direction to move into locking engagement with said locking element to hold the cover in a remote position from said bridge member, spring means adapted to move said cover toward said bridge member and into engagement with the margin of said opening when said rotatable element is out of locking engagement with said locking element, and means connecting said manually rotatable element with said stem permitting rotation of the former independently of the latter when the cover engages said margin, said rotatable element cooperating with said locking element to effect further upward movement of the cover when said rotatable element is rotated independently of the stem.

2. In a pressure cooker comprising a receptacle having an eliptical top opening and a cover with the cover engageable with the underside of the margin of said opening and insertable therethrough when tilted and rotated 90° out of alignment with the opening, means for effecting rotation of the cover into and out of alignment with the opening and movement thereof upwardly into sealing engagement with said margin when aligned with said cover, said means comprising a bridge member adapted to rest on the receptacle and supporting said cover for rotation and vertical movement relative thereto, a locking element fixed to said bridge member, a manually rotatable element connected to said cover for rotating said cover relative to said bridge member and adapted by rotation in one direction to move into locking engagement with said locking element to hold the cover in a remote position from said bridge member, spring means adapted to move said cover toward said bridge member and into engagement with the margin of said opening when said elements are out of locking engagement with each other, and means connecting said manually rotatable element with said cover permitting rotation of the former independently of the latter when the cover engages said margin, said rotatable element cooperating with said locking element to effect further upward movement of the cover when said rotatable element is rotated independently of the cover.

3. In a pressure cooker comprising a receptacle having an elliptical top opening and a cover with the cover engageable with the underside of the margin of said opening and insertable therethrough when tilted and rotated 90° out of alignment with the opening, means for effecting rotation of the cover into alignment with the opening and movement thereof upwardly into sealing engagement with said margin, said means comprising means adapted to engage the receptacle and supporting said cover for rotation and vertical movement relative thereto, a manually rotatable element connected to said cover for rotating said cover and adapted by rotation in one direction to move into locking engagement with said receptacle engaging means to hold the cover in a remote position from the latter means, spring means adapted to move said cover toward the latter means and into engagement with the margin of said opening when said element is free of said locking engagement, and means connecting said element with said cover permitting rotation of the former independently of the latter when the cover engages said margin, said element cooperating with said receptacle engaging means to effect further upward movement of the cover when said element is rotated independently of the cover.

4. A pressure cooker comprising a receptacle having an elliptical top opening, a cover engageable with the underside of the margin of said opening and insertable therethrough when tilted and rotated 90° out of alignment with the opening, means adapted to engage the receptacle and supporting the cover for rotation and vertical movement relative to the receptacle, a manually rotatable element carrying said cover and normally rotatable with said cover, said element being adapted by rotation in one direction to rotate said cover out of alignment with the opening and to engage said means in locking relation to hold the cover in a remote position from said means, and by rotation in the opposite direction to rotate said cover into alignment with said opening and to be disengaged from locking relation with said means, and a spring for moving said cover into engagement with the margin of said opening when said element is disengaged from locking relation with said means, said element being rotatable relative to said cover when the latter engages said margin and cooperating with said means to effect further upward movement of the cover.

5. In a pressure cooker comprising a receptacle having an elliptical top opening and a cover with the cover engageable with the underside of the margin of said opening and insertable therethrough when tilted and rotated 90° out of alignment with the opening, means for effecting rotation of the cover into alignment with the opening and movement thereof upwardly into sealing engagement with said margin, said means comprising a bridge member adapted to rest on the receptacle and supporting said cover for rotation and vertical movement relative thereto, a locking element fixed to said bridge member, a manually rotatable element connected to said cover for rotating said cover relative to said bridge member and adapted by rotation in one direction to move into locking engagement with said locking element to hold the cover in a remote position from said bridge member, spring means adapted to move said cover toward said bridge member and into engagement with the margin of said opening when said elements are out of locking engagement with each other, and means frictionally connecting said manually rotatable element with said cover and having less frictional resistance than the frictional engagement of said cover with said margin to permit rotation of said manually rotatable element relative to said cover when said cover engages said margin, said elements having cooperating cam portions to effect further upward movement of the cover when said rotatable element is rotated relative to said cover.

6. In a pressure cooker comprising a receptacle having an elliptical top opening and a cover with the cover engageable with the underside of the margin of said opening and insertable therethrough when tilted and rotated 90° out of alignment with the opening, means for effecting rotation of the cover into alignment with the opening and movement thereof upwardly into sealing engagement with said margin, said means comprising a bridge member adapted to rest on the receptacle and supporting said cover for rotation and vertical movement relative thereto, a fixed element mounted on said bridge member and having a locking surface and a cam surface, a manually rotatable element connected to said cover for rotating said cover relative to said bridge member and having a pair of lugs respectively engageable with said surfaces on said fixed element, said manually rotatable element being adapted by rotation in one direction to move one of said lugs into locking engagement with said locking surface to hold the cover in a remote position from said bridge member, a spring adapted to move said cover toward said bridge member and into engagement with the margin of said opening when said one lug is out of engagement with said locking surface, and means connecting said manually rotatable element with said cover permitting rotation of the former independently of the latter when the cover engages said margin, the other of said lugs engaging said cam surface to effect further upward movement of the cover when said manually rotatable element is rotated independently of the cover.

7. In a pressure cooker comprising a receptacle having an elliptical top opening and a cover with the cover engageable with the underside of the margin of said opening and movable therethrough when tilted and rotated 90° out of alignment with the opening, means for effecting rotation of the cover into alignment with the opening and movement thereof upwardly into sealing engagement with said margin, said means comprising a vertical stem projecting from the cover, a bridge member adapted to rest on the receptacle and rotatably and slidably supporting said stem, a cup-shaped locking element fixed to said bridge member and having a locking surface in its side and a cam surface on its upper edge, a cup-shaped manually rotatable member telescoping over said locking element and connected to said stem for rotating said cover relative to said bridge member and having a pair of lugs engageable with said surfaces, said manually rotatable member being adapted by rotation in one direction to move one of said lugs into engagement with said locking surface to hold the cover in a lowered position relative to the bridge member, a spring surrounding said stem within said elements and adapted to raise said cover toward said bridge member and into engagement with the margin of said opening when said one lug is released from said locking surface, and means connecting said manually rotatable element with said stem permitting rotation of the former independently of the latter when the cover engages said margin, the other of said lugs engaging said cam surface to effect further upward movement of the cover when said manually rotatable element is rotated independently of the stem.

8. In a pressure cooker comprising a receptacle having an elliptical top opening and a cover with the cover engageable with the underside of the margin of said opening and movable therethrough when tilted and rotated 90° out of alignment with the opening, means for effecting rotation of the cover into alignment with the opening and movement thereof upwardly into sealing engagement with said margin, said means comprising a vertical stem projecting from the cover, a bridge member adapted to rest on the receptacle and rotatably and slidably supporting said stem, a locking element fixed to said bridge member, a manually rotatable element connected to said stem for rotating said cover relative to said bridge member and adapted by rotation in one direction to move into locking engagement with said locking element to hold the cover in a remote position from said bridge member, a coiled spring surrounding said stem and adapted to move said cover toward said bridge member and into engagement with the margin of said opening when said rotatable element is out of locking engagement with said locking element, and means connecting said manually rotatable element with said stem permitting rotation of the former independently of the latter when the cover engages said margin, said connecting means comprising a pair of discs rotatable respectively with said manually rotatable element and said stem, one of said discs carrying a plurality of spherical head pins and the other disc having a plurality of depressions to receive said spherical heads, and said spring tending to hold said heads in said depressions to cause rotation of the two discs together, said rotatable element cooperating with said locking element to effect further upward movement of the cover when said discs are rotated relative to each other.

9. In a pressure cooker comprising a receptacle having an elliptical top opening and a cover with the cover engageable with the underside of the margin of said opening and movable therethrough when tilted and rotated 90° out of alignment with the opening, means for effecting rotation of the cover into alignment with the opening and movement thereof upwardly into sealing engagement with said margin, said means comprising a vertical stem projecting from the cover, a bridge member adapted to rest on the receptacle and rotatably and slidably supporting said stem, a locking element fixed to said bridge member, a manually rotatable element connected to said stem for rotating said cover relative to said bridge member and adapted by rotation in one direction to move into locking engagement with said locking element to hold the cover in a remote position from said bridge member, a coiled spring surrounding said stem and adapted to move said cover toward said bridge member and into engagement with the margin of said opening when said rotatable element is out of locking engagement with said locking element, and means connecting said manually rotatable element with said stem permitting rotation of the former independently of the latter when the cover engages said margin, said connecting means comprising a pair of discs rotatable respectively with said manually rotatable element and said stem, one of said discs carrying a plurality of pins held in frictional engagement with the other disc by said spring to cause rotation of the discs together, said rotatable element cooperating with said locking element to effect further upward movement of the cover when the frictional resistance of the cover against said margin exceeds the frictional resistance of said pins against said other disc, and a washer interposed between said discs and having arcuate slots through which said pins extend to limit the relative movement of the discs.

10. In a pressure cooker comprising a receptacle having an elliptical top opening and a cover with the cover engageable with the underside of the margin of said opening and insertable therethrough when tilted and rotated 90° out of alignment with the opening; means for effecting rotation of the cover into and out of alignment with the opening and movement thereof upwardly into sealing engagement with said margin when aligned with said cover, said means comprising a bridge member adapted to rest on the receptacle and suporting said cover for rotation and vertical movement relative thereto, a manually rotatable element connected to said cover for rotating the cover relative to said bridge member and adapted by such rotation to move the cover into and out of alignment with said opening, spring means adapted to move said cover toward said bridge member and into engagement with the margin of said opening when the cover is in alignment with said opening, means connecting said manually rotatable element with said cover permitting rotation of the former independently of the latter when the cover engages said margin, and an element fixed to said bridge member and cooperating with said manually rotatable element, when the latter is rotated independently of the cover, to effect further upward movement of the cover.

JAMES L. HVALE.